UNITED STATES PATENT OFFICE.

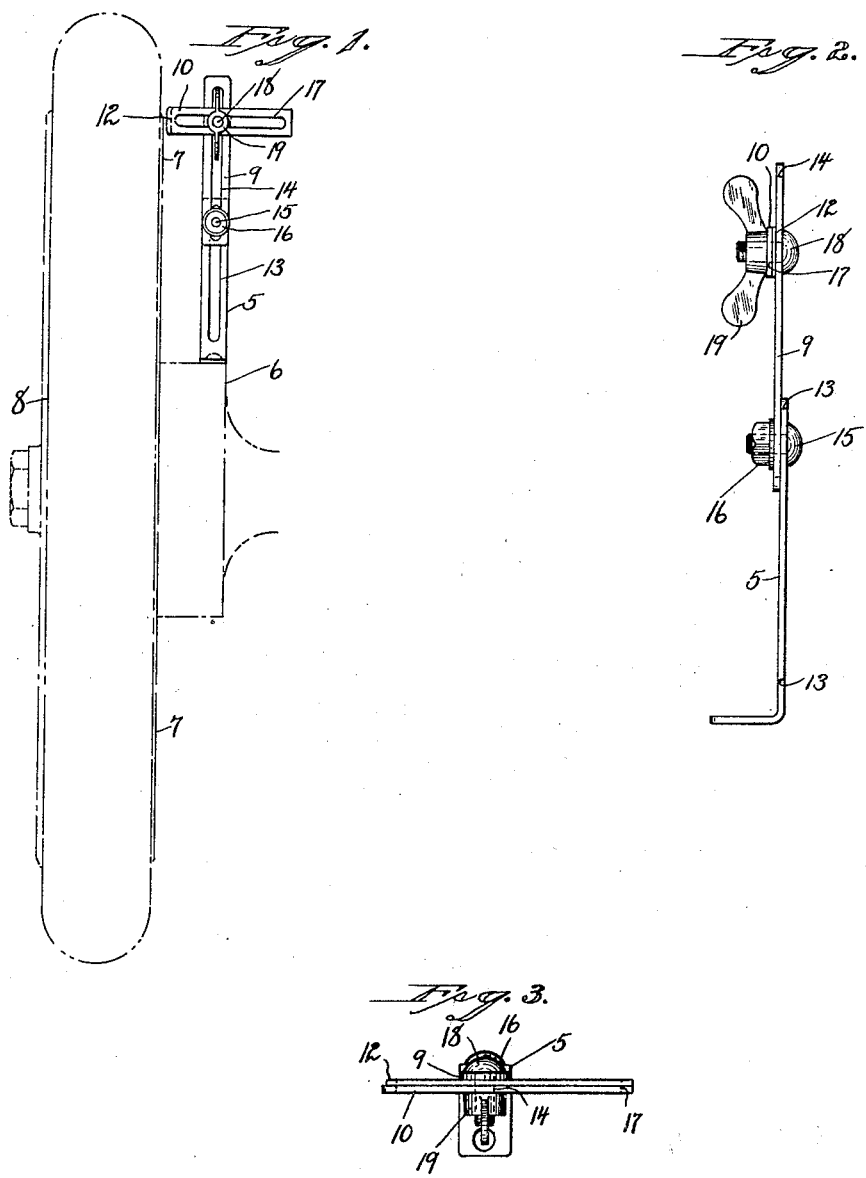

ISRAEL SCHWARTZ, OF DANBURY, CONNECTICUT.

WHEEL TRUING GAUGE AND ALARM.

1,410,224.  Specification of Letters Patent.  Patented Mar. 21, 1922.

Application filed July 23, 1921. Serial No. 486,947.

*To all whom it may concern:*

Be it known that I, ISRAEL SCHWARTZ, a citizen of the United States, residing at Danbury, in the county of Fairfield and State of Connecticut, have invented a new and useful Improvement in Wheel-Truing Gauges and Alarms; and I do hereby declare the following, when taken in connection with the accompanying drawings and the characters of reference marked thereon, to be a full, clear, and exact description of the same, and which said drawings constitute part of this application, and represent, in—

Fig. 1, a face view of a wheel-truing gauge and alarm constructed in accordance with my invention, and shown as arranged adjacent to a vehicle wheel;

Fig. 2, a side view of the gauge and alarm device detached and on an enlarged scale;

Fig. 3, a top or plan view of the same.

This invention relates to improvement in wheel-truing gauges and alarms. In attaching demountable rims to automobile wheels, difficulty is experienced in setting the rim true, and various devices have been provided to determine whether or not the rim is true, but these devices are usually independent devices and not carried by the vehicle.

The object of this invention is to provide a device which may be attached to the vehicle, adjacent to the wheel, so that, when the rim is applied, it may be readily gauged. It sometimes happens that in traveling over rough roads, the rim becomes slightly misplaced, so as not to run true, and a further object of this invention is to provide an alarm which will indicate to the driver when this has occurred, and the invention consists in the construction and arrangement of parts as will be hereinafter described and particularly recited in the claims.

In carrying out my invention, I employ a post 5 adapted to be secured to a brake-band box 6, or other fixed part of the vehicle adjacent to the inner edge of the rim 7 of the usual wheel 8. Adjustably connected with the post 5 is an arm 9 to which is adjustably connected a finger 10 adapted to project outward, into line with, and adjacent to the rim 7, so that, when the wheel is revolved on its axis, any irregularities of alignment may at once be noticed. Arranged parallel with the finger 10 and secured to the arm 9 is an alarm-plate 12. This plate is a strip of metal corresponding in width to the width of the finger, but slightly shorter than the finger. If, in revolving, the wheel does not run perfectly true, the rim will engage with the finger 10 and snap it against the plate 12, producing sufficient noise to attract the attention of the driver and indicating at once that the wheel is not perfectly true.

By providing the post 5 with a slot 13 and the arm 9 with a slot 14, the arm may be adjusted upon the post at various elevations and at various angles, by means of a bolt 15 and nut 16. The finger 10 is also provided with a slot 17 and the finger and plate are secured to the arm 9 by means of a bolt 18 and wing-nut 19.

With this device, rims, when applied to wheels, may be secured perfectly true, and in case of accidental displacement, an alarm will be given to indicate such displacement.

The truing gauge herein shown is not claimed apart from the alarm mechanism, but is made the subject of a separate application, filed January 23, 1922, Serial No. 531,129.

I claim:

1. A wheel rim truer, comprising a post adapted to be secured to a fixed point adjacent to a vehicle wheel, and an adjustable finger adapted to be moved into line with the wheel rim, and an alarm-plate arranged parallel with said finger.

2. A wheel rim truer, comprising a post adapted to be secured to a fixed point adjacent to a vehicle wheel, an arm secured to said post, and a finger adjustably connected with said arm, and an alarm-plate secured to the said arm in line with the said finger.

In testimony whereof, I have signed this specification in the presence of two subscribing witnesses.

ISRAEL SCHWARTZ.

Witnesses:
 DANIEL T. CORBETT,
 LOUIS K. TAYLOR.